Jan. 8, 1935.  R. MacEACHEN  1,987,261

MATERIAL GATHERING AND LOADING APPARATUS

Filed Dec. 31, 1931  7 Sheets-Sheet 2

Roderick MacEachen,
INVENTOR

BY Victor J. Evans & Co.
ATTORNEY

Fig. 4.

Patented Jan. 8, 1935

1,987,261

UNITED STATES PATENT OFFICE 1,987,261

MATERIAL GATHERING AND LOADING APPARATUS

Roderick MacEachen, Morgantown, W. Va.

Application December 31, 1931, Serial No. 584,249

32 Claims. (Cl. 198—11)

The invention relates to a material gathering and loading apparatus and more especially to a mining machine for gathering and loading coal, ore and other material into mine cars, the machine being in the nature of a loader.

The primary object of the invention is the provision of an apparatus or machine of this character wherein the material will be operated upon at one end of the said apparatus or machine for the collection of such material and the conveying of the same to a point of deposit, particularly into mine cars and in the deposit of the material, for example, coal, the latter will be distributed so that a full and maximum load may be had in each car.

Another object of the invention is the provision of an apparatus or machine of this character wherein the construction thereof is such as to enable maximum reach to be had and in the gathering of loose materials a wide range of adjustment is attainable so that the materials may be gathered at varying localities with respect to the position assumed by the carriage of such apparatus or machine and a full gathering effected without the necessity of a change of position of the carriage.

A further object of the invention is the provision of an apparatus or machine of this character wherein the gathered materials will be conveyed to a hopper within the carriage of such apparatus or machine, whence the confined material will be transferred continuously for the loading of mining cars and in such loading the material is packed and pressed therein as well as distributed uniformly for complete filling of the same and the gathering and loading operation being entirely automatic, thus enabling the apparatus or machine to have the attention of but a single operator or attendant, the parts of the mechanism of the apparatus or machine being readily accesible and any of these can be taken off without the removal of other parts and such mechanisms are associated with each other for a unity of operation.

A still further object of the invention is the provision of a machine of this character wherein the gathering mechanism is of novel form and in its arrangement enables a maximum extent of adjustment so that materials may be collected from either side or from one end of said apparatus or machine and the gathering mechanism may be shuttled to the work and the material gathered without leaving cleanings.

A still further object of the invention is the provision of an apparatus or machine of this character wherein the gathered material can be handled with dispatch in the loading of mine cars to full capacity and the loading end of such apparatus or machine is of a flexible character so that the end may be shifted both vertically and laterally to meet the condition required at the mining car, the loading mechanism being of novel form and the operation thereof carried forth automatically.

A still further object of the invention is the provision of an apparatus or machine of this character wherein the same in its entirety is novel so that materials when loosened from a foundation can with dispatch be collected or gathered and conveyed to a delivery point for the deposit of such materials into containers such as mine cars and the filling thereof to maximum capacity assured.

A still further object of the invention is the provision of an apparatus or machine of this character which is comparatively simple in its construction, thoroughly reliable and efficient in its purposes, automatically adjusted according to the needs in the handling of loads and in the gathering thereof, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Similar reference characters indicate corresponding parts throughout the several views in the drawings.

Referring to the drawings in detail the apparatus or machine A comprises in its entirety a pair of spaced motor propelled wheeled trucks 10 and 11 respectively, these supporting in their spaced relation to each other a carriage or body 12, the wheels 13 of the trucks being designed to travel upon track rails 14, these laid under a system within a mine, the carriage or body 12 having a circular or rounded end 15 and within this rounded end is arranged a hopper 16 which is of corresponding shape thereto.

Extended over and within the hopper 16 is a shuttled material gatherer mechanism B and loading or delivering mechanism C respectively, the details of constructions of which will be hereinafter fully described.

The shuttled gatherer mechanism B comprises a pair of spaced substantially parallel universal jointed gatherer chains 17, each of endless type and includes the separable hinge unit 18 and the double pivot unit 19, the pivots 20 of the latter engaging the hinge unit 18 and the hinge 21 of this unit being of a separable kind. Each of these chains 17 has its hinge 21 at right angles to the pivot 20 of the respective units 18 and 19 so that universal action is inherent in the chain, the pair of chains being trained in the side guides 22 of a boom of substantially gooseneck formation with the outer end of said boom disposed at a lower level than the inner end thereof. The side guides 22 at opposite ends carry tensioning heads 23 having journaled therein sprocket wheels 24 about which are trained the chains 17 and between these side guides is a material conveying trough 25 which has at its outer end rounded double shovels 26 which extend beyond the outer ends of the side guides 22 and are adapted to be brought to rest upon the floor of the mine when operating the apparatus or machine therein.

Each of the chains 17 carries thereon gatherer arms 27, these being pivotally mounted at 28 an equidistance apart throughout the extent of the said chain so that on the travel of the inner stretch of the chain longitudinally of the trough 25, these arms 27 will be projected at right angles to said stretch of the side guides 22 into gathering position and upon said arms 27 reaching the end of the side guides 22 at the inner end of the boom they will be caused to fold inward in parallel relation to the outer stretch of the chain until such arms reach the ends of the side guides 22 at the shovels 26 whence they will assume gathering position. To effect movement to the gathering arms 27 for gathering and non-gathering positions each side guide 22 has provided at its inner edge an abutment bar 29 against which is adapted to work an extension heel 30 on each arm 27 so as to hold the latter in gathering position braced during travel thereof through the trough 25, while located spaced from the outer edge of each guide 22 is an abutment bar 31 with which engage the arms 27 for the folding thereof when traveling outside of the trough 25.

At the shovel end of the guides 22 and at the outer side thereof are trip shoulders 32 which form continuations of the bars 29 so that the heel extension 30 of the arms 27 when meeting the shoulders 32 will ride upon the same and onto the bars 29 for the automatic shifting of the arms to gathering position upon entering and traversing the trough 25 as should be obvious.

Each arm 27 has removably fitted therein cutting bits 33, these being arranged in gradually receding vertically related positions from the free ends of said arms 27 and function to cut material from a foundation, for example, coal within a mine to loosen the material during the working of the gathering arms 27 at the shovels 26 which arms will collect or gather the loosened material and convey the same into and through the trough 25 for the flow of the material into the hopper 16.

The gatherer mechanism B can be shuttled to its work and the mounting therefor comprises a longitudinally disposed toothed rack 34 on the underside of each side guide 22 at its inner end portion, which rack 34 meshes with a rack pinion 35 fixed to a horizontal transversely disposed shaft 36 journaled in the bearings 37 of a substantially U-shaped cradle 38 centrally pivoted at 39 to a laterally swinging coupling 40 at its center, the same at one end engaging a king bolt 41 of the truck 10, which bolt extends into the rounded end 15 of the carriage or body 12 centrally of this end, while the other end of the coupling 40 is forked to provide the spaced horns 42 carrying rollers 43 at their ends engaging angle strips 44 of a housing 45 depending from the outer end of the boom, these angle strips 44 permit the raising and lowering action of the boom when the same is being shuttled to and from the work. Engaging the shaft 36 are supports 46 which are slidably joined with the side guides 22 of the boom and in this manner the latter can vertically swing and also shift laterally to assume angular positions. Furthermore by the pivotal connection 39 of the cradle 38 with the coupling 40 the said boom is permitted for lateral tilting action whereby the shovels 26 when contacting with the floor of a sloping kind the boom will automatically accommodate itself to the slope of such floor.

Within the housing 45 is a suitable power motor 46 having connection through suitable gearing (not shown) within a gear case 47 with operating shafts 48, these through suitable gear connections at the outer ends of the side guides 22 of the boom operate the chains 17 having the gathering arms 27 thereon.

Associated with the chain 17 at the outer ends of the side guides 22 and operatively connected therewith are rotatable snubber disks 49 having peripheral cutting teeth 50 which serve to snub the material when it does not fall freely and in general to facilitate the operation of gathering the material into the gatherer mechanism B of the apparatus or machine.

The coupling 40 has bearings 51 carrying traction rollers 52, these overhanging and engaging a circular track 53 at the rounded end 15 of the carriage or body 12 and in this manner easy swinging movement laterally of the coupling 40 is assured during angular disposition of the gatherer mechanism B.

Figures 5, 6, 7, 8, 9:
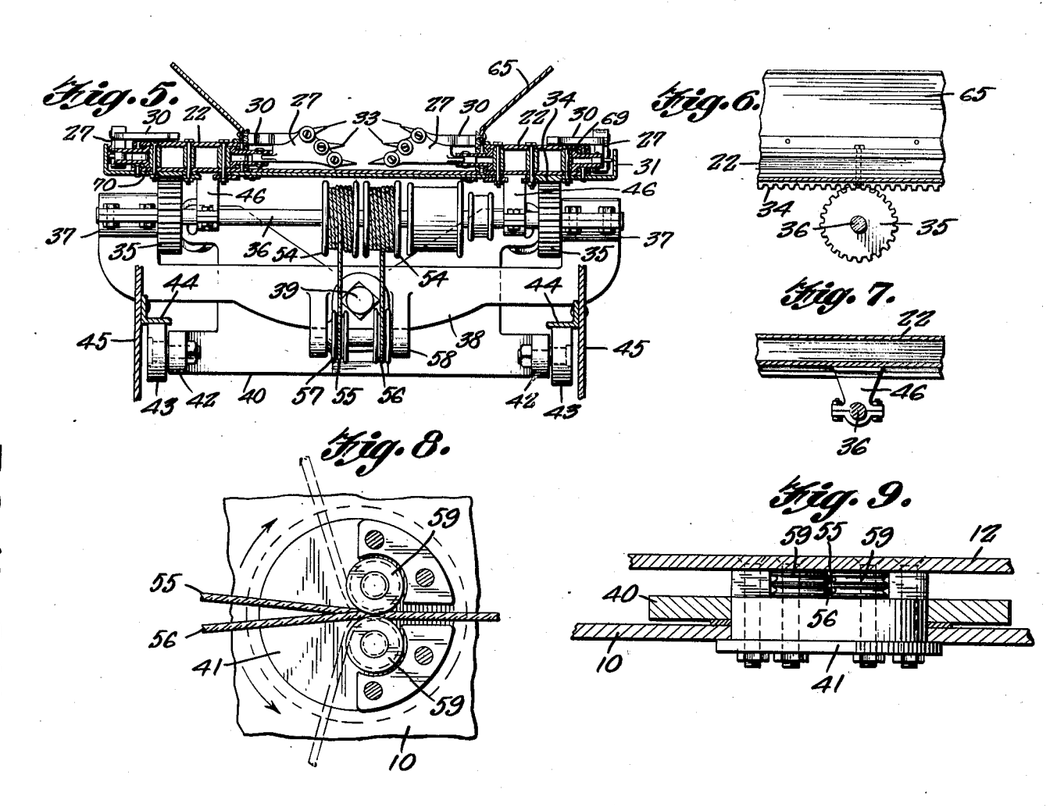
Figure 5 is a vertical transverse sectional view taken approximately on the line 5—5 of Figure 1 looking in the direction of the arrows.
Figure 6 is a detail side elevation of the shuttle rack and its companion rack gear for the gathering mechanism.
Figure 7 is a fragmentary vertical longitudinal sectional view through the shuttle shaft and the hanger connection therewith of the gathering mechanism.
Figure 8 is an enlarged fragmentary plan view of the king bolt and adjuncts for the gathering mechanism.
Figure 9 is a vertical sectional view thereof showing the king bolt in side elevation.
Figure 10:
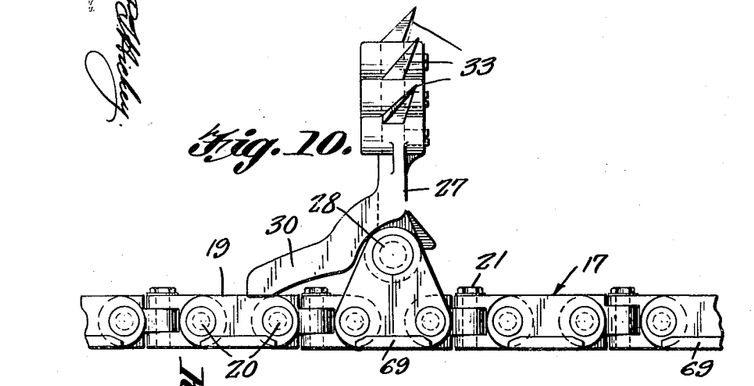
Figure 10 is a fragmentary enlarged plan view of one of the universal jointed gatherer chains.
Figure 11:
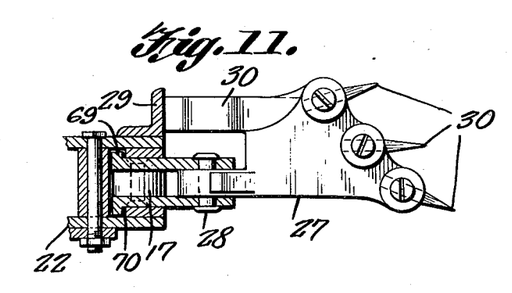
Figure 11 is an enlarged transverse sectional view thereof showing one gatherer in elevation.
Figure 12:
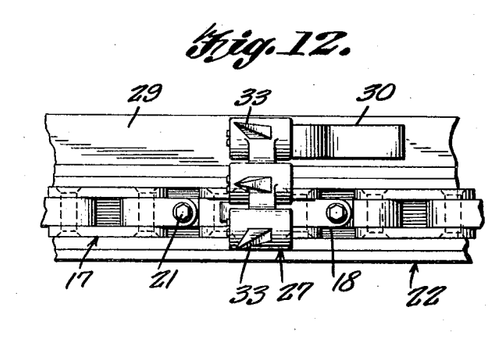
Figure 12 is a fragmentary side elevation of the chain with one of the gatherers in the position as shown in Figures 10 and 11.
Figure 13:
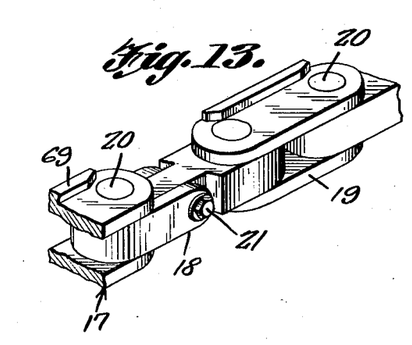
Figure 13 is a fragmentary perspective view of the chain showing in detail its assembly.

On the horizontal shaft 36 are fixed a pair of windlasses 54, these having reversely wound thereon the actuater cables 55 and 56 respectively, which are trained over guide pulleys 57 journaled in a bracket 58 on the cradle 38 at its center, the cables being extended centrally of the king bolt 41 between double pulleys 59 and thence reversely wound upon a double power pulley 60 operated through gearing connection (not shown) with a suitable power motor 61, the double pulleys 59 upon the king bolt being disposed with relation to the center of said bolt so that on any angular disposition of the gatherer mechanism B it will not interfere or disturb the cables 55 and 56 which on operation thereof will transmit motion to the pinions 35 meshing with the rack 34 so that the said boom of the gatherer mechanism B will be automatically shuttled to and from the work as should be apparent.

Arranged at the inner end of the trough 25 is a bottom section 62 and the side guides 22 of the boom have the guideways 63 accommodating said bottom 62, these guideways 63 being disposed for a distance at the inner ends of said guides 22 so that when the gatherer mechanism B is shuttled to the work the bottom section 62 by reason of its disposition to the trough 25 will function to extend the said trough well over the hopper 16 whereby the gathered material carried through the trough will flow off of the bottom section 62 into the hopper, the bottom being anchored stationarily through the medium of a chain 64 to the bearings 51 so as not to move with the boom on the shuttling of the same. Thus it will be seen that at all times the inner end of the boom of the gatherer mechanism B will be open to the hopper 16, whether the said boom is shuttled to the work or away from the same and in this fashion the gathered material will be assured of flowing into the hopper during the operation of the apparatus or machine, the bottom 62 being seated to overhang the said hopper irrespective of the shuttle action of said mechanism B.

It should be apparent that by reason of the mounting of the gatherer mechanism B the same can be extended or retracted by shuttle action with respect to the carriage or body 12 and the extension is of maximum range so as to enable the reaching of work a considerable distance from the point of location of the carriage or body 12 of the apparatus or machine. Whether the mechanism B be extended or contracted it is susceptible of delivering its gathered material directly into the hopper 16 and also can be angularly disposed or brought to longitudinal alignment or assume a side tilt with respect to the carriage or body 12 so that the mechanism B adapts itself to the conditions of the work.

The side guides 22 of the boom have coextensive therewith upwardly divergent side boards or fenders 65 to prevent the gathered material from falling from the mechanism B during the conveying of such material through the trough 25 into the hopper 16 of the apparatus or machine.

Arranged in the circular end 15 of the carriage or body 12 are guide pulleys 66 having trained thereover cables 67, these being fixed to the coupling 40 and extend to windlass 68 where the same are reversely wound thereon and this windlass through suitable gear connection (not shown) is operated from the motor 61 so that the gatherer mechanism B can be automatically angularly adjusted for swinging action upon the king bolt 41 to bring the boom of said mechanism to any angle within an arc of approximately 180 degrees and thus the said mechanism can reach the work at any point of this arc of movement for the gathering of material and the conveying thereof to the hopper 16 of the apparatus or machine.

Figure 14:
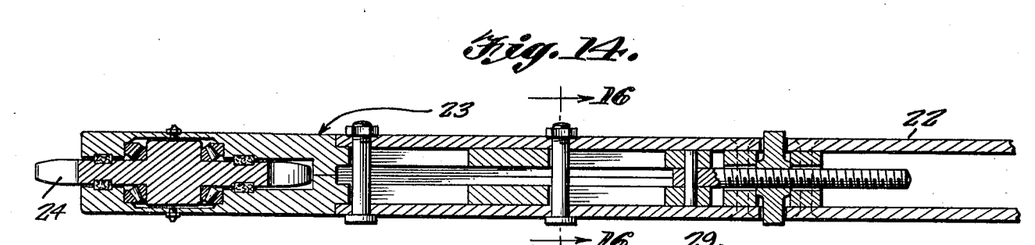
Figure 14 is a fragmentary vertical longitudinal sectional view through one end portion of the chain guide frame.
Figure 15:
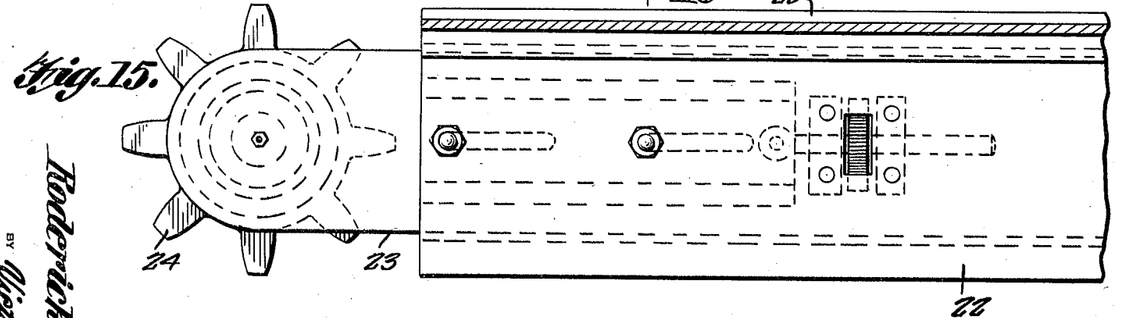
Figure 15 is a top plan view thereof.
Figure 16:
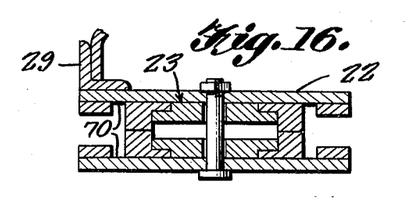
Figure 16 is a sectional view on the line 16—16 of Figure 14 looking in the direction of the arrows.

The double pivot links 19 of the endless chain 17 have formed thereon at their inner edges guide ribs 69, these being designed to travel in ways 70 formed in the side guides 22 so as to maintain the inner and outer stretches of the said chain 17 straight during the travel thereof in the working of the gatherer mechanism B and in this fashion these chains 17 are movably connected with the side guides.

Figure 1:
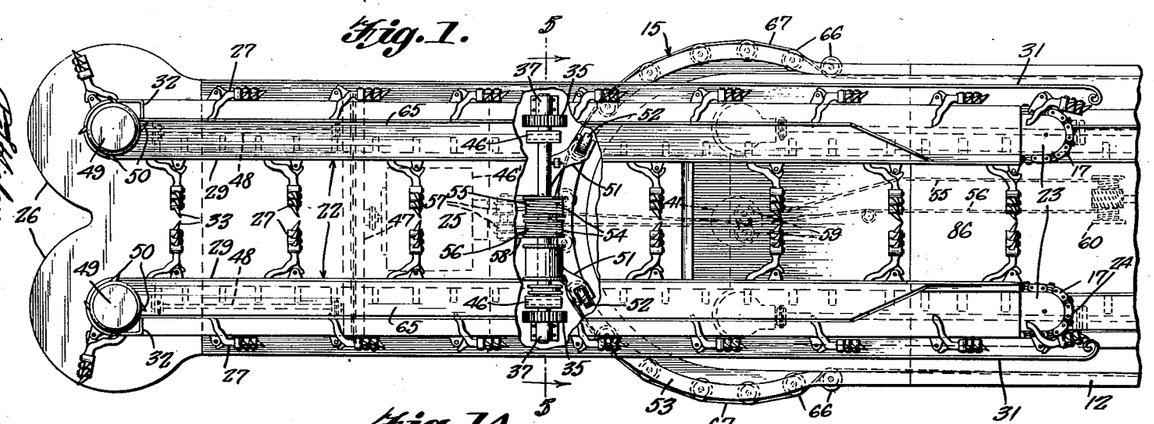
Figure 1 is a top plan view of the gathering portion of the apparatus or machine constructed in accordance with the invention.
Figure 1A:
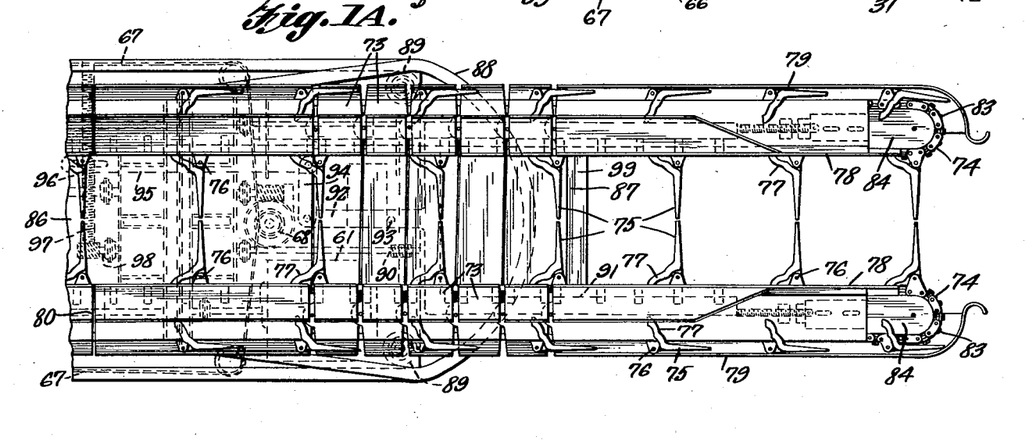
Figure 1A is a similar view of the loading or delivering portion of said apparatus or machine and is a continuation of Figure 1.
Figure 2:
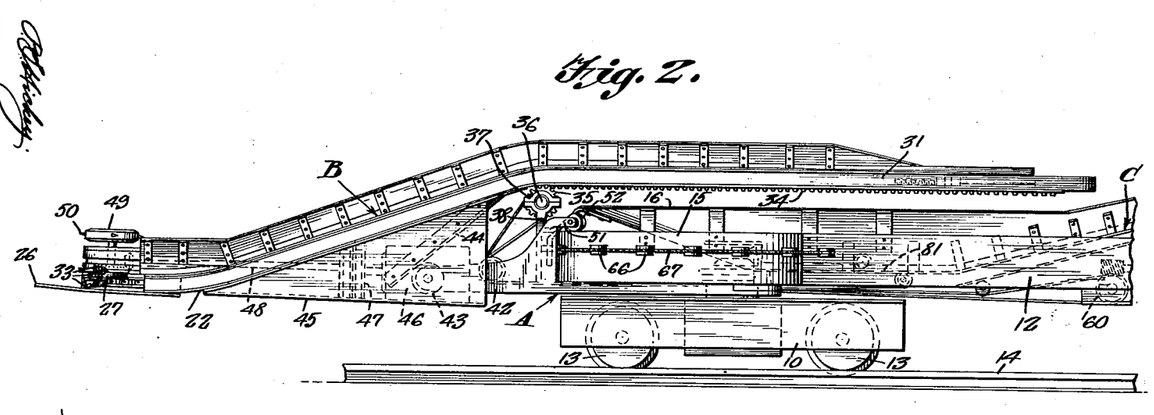
Figure 2 is a side elevation of that portion of the apparatus or machine shown in Figure 1.
Figure 2A:
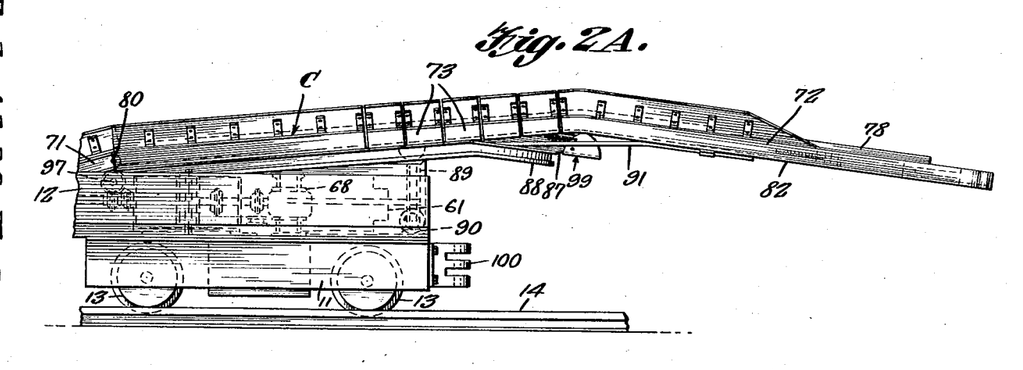
Figure 2A is a side elevation of that portion of the apparatus or machine shown in Figure 1A.
Figure 3:
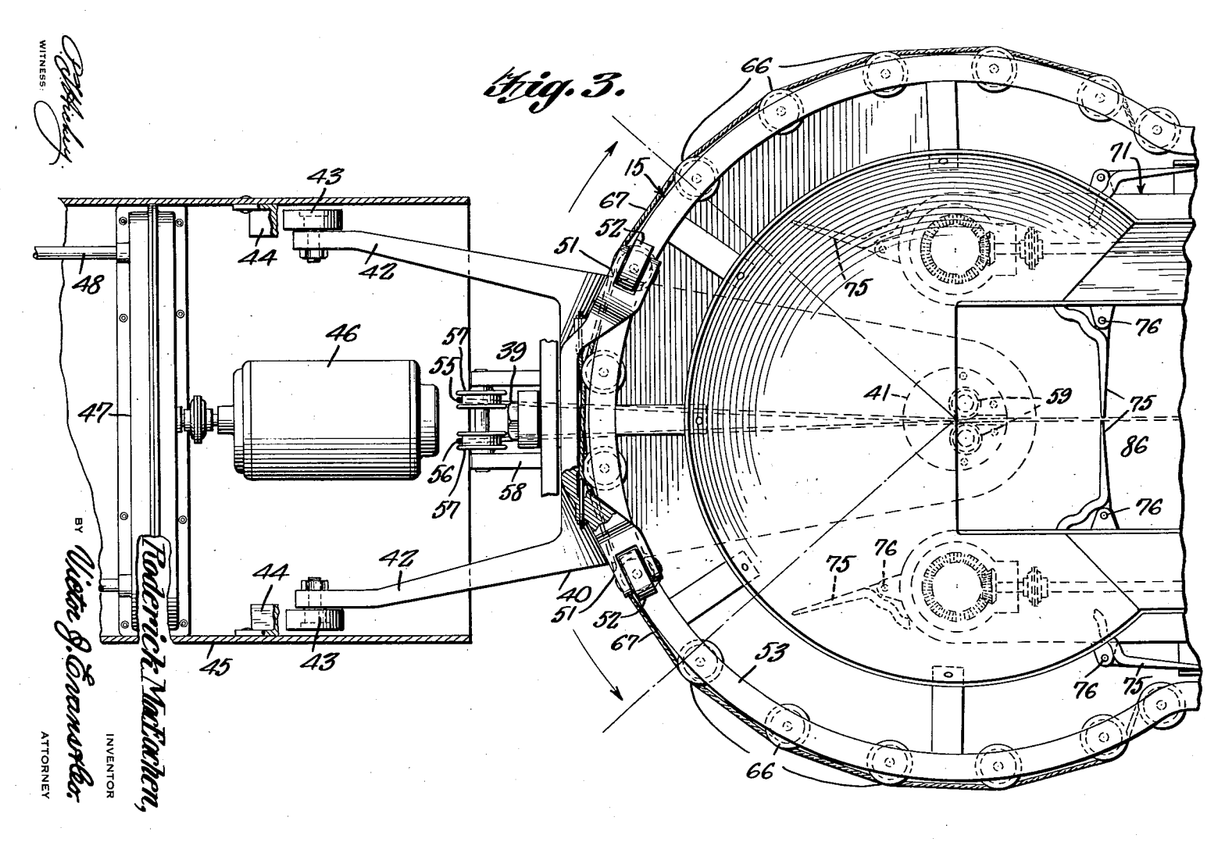
Figure 3 is a fragmentary horizontal sectional view taken at the point of connection of the gathering mechanism with the carriage of the apparatus or machine.
Figure 4:
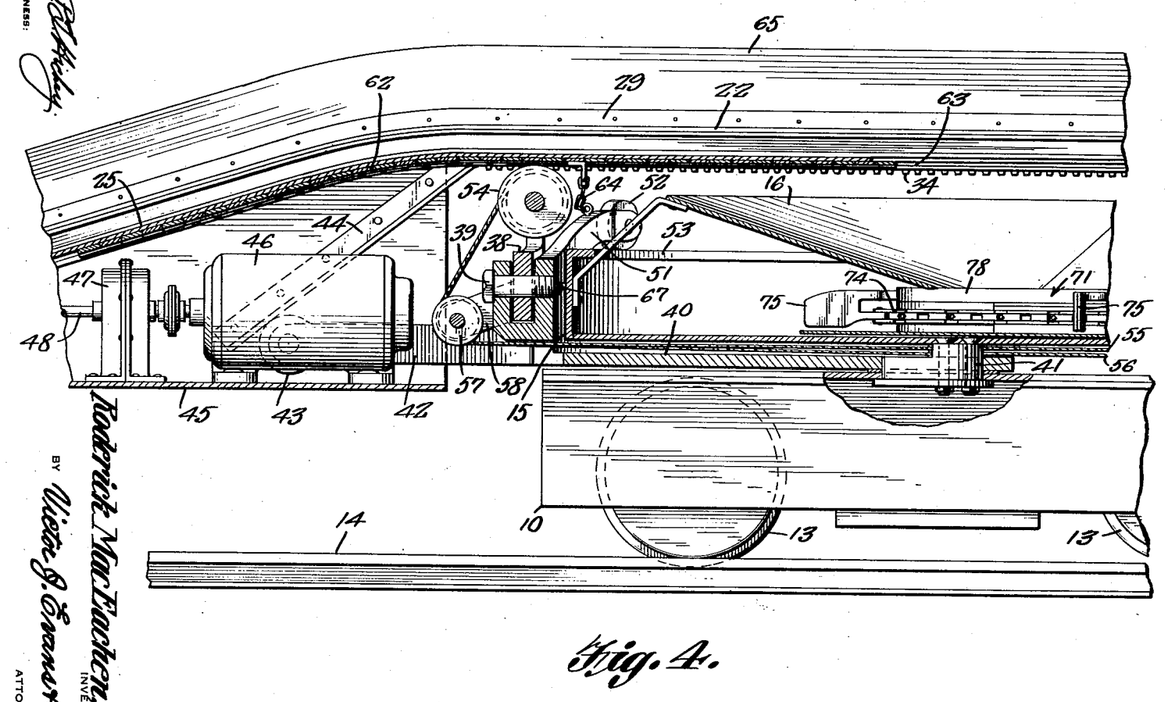
Figure 4 is a fragmentary central longitudinal sectional view through that portion of the apparatus or machine shown in Figure 3.

The loading or delivering mechanism C comprises a conveyor frame involving the inner and outer spaced parallel sections 71 and 72 respectively, while the latter includes a lateral flexing portion formed with pivotally joined knuckles 73, these constituting a part or unit with the sections 72 and trained about the same are endless universal jointed flight chains 74 each in its construction being identical to the chains 17 and carry pivotally supported foldable flight arms 75, these being pivoted at 76 and are formed with heel extensions 77 which are adapted to work against a guide bar 78 carried at the inner edges of the sections 71 and 72 and the flexing portions 73 of the conveyor frame while also carried by the latter at the outer edges thereof are abutment bars 79 which are designed to act upon the flight arms 75 to fold the same inwardly when traveling outside of the said sections 71 and 72 and portions 73 of the conveyor frame.

The sections 72 of the conveyor frame at their inner ends are connected with the sections 71 through the medium of a hinged joint 80 so that the outer extent of said conveyor frame can be swung vertically for the raising and lowering thereof accordingly to the height of a mining car and the load placed therein, while the sections 71 of the conveyor frame are forwardly inclined with a straight end 81 extended within the hopper 16 beneath its open discharge bottom for receiving the material poured into this hopper, while the outer end portion 82 of the sections 72 is reversely inclined or rearwardly sloped with respect to the sections 71, the endless chains 74 being trained about sprockets 83 carried at the ends of the conveyor frame and one pair of these sprockets is supported in tensioning heads 84 while the other pair of said sprockets constituting the power elements for the chains 74 are operatively connected through suitable gearing (not shown) to a power motor 61 whereby the chains 74 will be driven in unison and through the flights 75 will transfer the material from the hopper 16 through the trough 86 of the conveyor frame and deliver the same through its outer open bottom by a discharge chute 87 into a mine car.

Underlying the sections 72 at their undersides inwardly with respect to the flexing portions 73 is a bridge or guiding yoke 88 upon which flex the portions 73 so that the delivery end of the conveyor frame can be arcuately swung laterally and this bridge or yoke is supported upon lifting jacks 89 suitably mounted within the carriage or body 12 so that on operating the same the said sections 72 of the conveyor frame can be raised or lowered vertically for the positioning of the delivery end of said conveyor frame with respect to the mine car to be loaded therefrom. The jacks 89 are operatively connected through the connections 90 with the motor 61 whereby the said jacks will be driven for the raising and lowering of the said sections 72 of the conveyor frame.

Connected with the underside of the sections 72 outwardly with respect to the flexing portions 73 thereof is a flexing yoke 91 having a center stem 92 pivoted at 93 for lateral arcuate swinging movement of said yoke. The stem 92 through the links 94 pivoted thereto and also pivoted to a throw arm 95 enables the arcuate shifting of said yoke, the throw arm 95 being operatively connected with a feed screw coupling 96 carried and shiftable upon a feed screw 97 suitably supported and having driven connection at 98 with the motor 61, thus it being seen that when the screw 97 is operated from the motor, motion will be imparted to yoke 91 to laterally shift the same and this motion will be imparted to the outer delivery end of the conveyor frame, the sections 72 thereof being flexed at the portions 73 of the same and in this manner the said delivery end of the conveyor frame can be properly located relative to the position of a mine car to deliver material thereto and load the same.

The discharge chute 87 on the conveyor frame carries an adjustable mouth 99 to regulate the direction of flow of the material from the conveyor frame of the loading or delivering mechanism C as will be obvious.

Each truck 10 and 11 of the apparatus or machine may carry suitable electric driving mechanism (not shown) and at one end of the truck 11 is a car coupler 100 for the attachment of a mine car therewith, the driving mechanism on each truck being for traction of the apparatus or machine to operating localities for the use thereof.

The flights 75 operate in a like manner to the gatherer arms 27 so that when these travel in the troughs 25 and 86 respectively they will be in operating positions while on travel of such elements outside of the troughs they will be in folded position and in this manner injury to an operator of the machine is eliminated.

It will be apparent that each of the gatherer arms 27 is constructed to be fitted with three standard cutting machine bits 33 which are placed one above the other at an angle of forty-five degrees, the uppermost bit of this series being approximately six inches above the trough 25. This angular position of the bit insures an operation against jamming a hard substance between any two opposite gatherer arms 27 as they pass around the shovels 26.

The bottom section 62 underlies the trough 25 and constitutes a telescopic-like extension for said trough 25 so that when the gatherer mechanism B is retracted this bottom will have been fully telescoped and thus the inner end of the said trough 25 will be open. As the gatherer mechanism B is shuttled forwardly this bottom 62 anchored at 64 will be held to the bearings 51 and on full extension of said mechanism B the inner end of the trough is closed so that a positive delivery or feed of material from the trough 25 to the hopper 16 is assured irrespective of the position of the said trough 25 of said mechanism.

During the delivery or loading of a mine car the flights 75 operating in the mechanism C will transfer material from the trough 86 through the chute 87 into the car and by the presence of the open end of the conveyor frame at the outer end portions of the sections 72 the flowing material into the car will be directed forwardly thereof and in this fashion the car will be filled by working the material from one end thereof forwardly and the material is constantly dragged forward, packed and pressed down so that the car is well filled and this operation being automatic dispenses with a rear operator on the loading machine.

It is of course to be understood that connections between the motor 61 and the mechanism of the apparatus or machine are regulated and controlled through suitable clutch mechanisms (not shown) and these being no part of the present invention.

The sections 71, 72 and portions 73 of the conveyor frame carry at their upper sides side boards or guards 101 which prevent the falling of the material to either side of the conveyor frame during the operation of the loading or delivering mechanism C.

What is claimed is:—

1. In an apparatus or machine of the character described, a truck, a carriage upon the truck and having a substantially circular-shaped hopper, a shuttled material gatherer mechanism including spaced substantially parallel universal jointed gatherer chains, foldable gatherer arms carried by the respective chains, a double shovel on said mechanism and cooperating with the gatherer arms when unfolded, mechanism on the carriage allowing vertical, arcuate and tilting movement to said gatherer mechanism, mechanism to shuttle the said gatherer mechanism to and from working position, and a bottom extension for the gatherer mechanism to communicate the latter at all times with the hopper.

2. In an apparatus or machine of the character described, a truck, a carriage upon the truck and having a substantially circular-shaped hopper, a shuttled material gatherer mechanism including spaced substantially parallel universal jointed gatherer chains, foldable gatherer arms carried by the respective chains, a double shovel on said mechanism and cooperating with the gatherer arms when unfolded, mechanism on the carriage allowing vertical, arcuate and tilting movement to said gatherer mechanism, mechanism to shuttle the said gatherer mechanism to and from working position, and a bottom extension for the gatherer mechanism to communicate the latter at all times with the hopper, the said gatherer mechanism forming a trough between the chains thereof and traversed by the gatherer arms when unfolded.

3. In an apparatus or machine of the character described, a truck, a carriage upon the truck and having a substantially circular-shaped hopper, a shuttled material gatherer mechanism including spaced substantially parallel universal jointed gatherer chains, foldable gatherer arms carried by the respective chains, a double shovel on said mechanism and cooperating with the gatherer arms when unfolded, mechanism on the carriage allowing vertical, arcuate and tilting movement to said gatherer mechanism, mechanism to shuttle the said gatherer mechanism to and from working position, a bottom extension for the gatherer mechanism to communicate the latter at all times with the hopper, the said gatherer mechanism forming a trough between the chains thereof and traversed by the gatherer arms when unfolded, and means for sustaining the gatherer arms unfolded when traversing the trough and folded when outside of the same.

4. An apparatus or machine of the character described comprising a vehicle, gatherer mechanism on the vehicle and having a trough, gatherer elements movable through the trough and adapted to be closed when outside of the same, a hopper on the vehicle communicative with the trough at its inner end, a coupling for the gatherer mechanism to permit horizontal swinging movement thereof, a cradle carried by the coupling and supporting the gatherer mechanism for vertical swinging movement and side tilting action, and mechanism adapted to shuttle the gatherer mechanism to and from work.

5. An apparatus or machine of the character described comprising a gatherer mechanism having a trough, gatherer elements movable through the trough, a hopper communicative with the trough at its inner end, mechanism adapted to shuttle the gatherer mechanism to and from work, and means including a turning coupling and a tilting cradle for supporting said gatherer mechanism for vertical, arcuate, and side tilting action.

6. An apparatus or machine of the character described comprising a gatherer mechanism having a trough, gatherer elements movable through the trough, a hopper communicative with the trough at its inner end, mechanism adapted to shuttle the gatherer mechanism to and from work, means including a turning coupling and a tilting cradle for supporting said gatherer mechanism for vertical, arcuate, and side tilting action, and means related with the trough to maintain communication between it and the hopper when the said gatherer mechanism is shuttled.

7. An apparatus or machine of the character described comprising a gatherer mechanism having a trough, gatherer elements movable through the trough, a hopper communicative with the trough at its inner end, mechanism adapted to shuttle the gatherer mechanism to and from work, means including a turning coupling and a tilting cradle for supporting said gatherer mechanism for vertical, arcuate, and side tilting action, means related with the trough to maintain communication between it and the hopper when the said gatherer mechanism is shuttled, and means for arcuately moving the gatherer mechanism.

8. An apparatus or machine of the character described comprising a gatherer mechanism having a trough, gatherer elements movable through the trough, a hopper communicative with the trough at its inner end, mechanism adapted to shuttle the gatherer mechanism to and from work, means including a turning coupling and a tilting cradle for supporting said gatherer mechanism for vertical, arcuate, and side tilting action, means related with the trough to maintain communication between it and the hopper when the said gatherer mechanism is shuttled, means for arcuately moving the gatherer mechanism, and means for vertically swinging said gatherer mechanism.

9. In an apparatus or machine of the character described, the combination of coal mining mechanism having a gatherer adapted for shuttle action to and from work, a hopper for the gatherer, means vertically pivoting the gatherer with the hopper, and a cradle related with the last named means for supporting the gatherer for vertical, swinging, and side tilting action.

10. In an apparatus or machine of the character described, the combination of coal mining mechanism having a gatherer adapted for shuttle action to and from work, a hopper for the gatherer, means vertically pivoting the gatherer with the hopper, a cradle related with the last named means and supporting the gatherer for vertical, swinging, and side tilting action, and a shovel member on said gatherer and shiftable for being loaded back upon a conveyor truck.

11. In an apparatus or machine of the character described, the combination of coal mining mechanism having a gatherer adapted for shuttle action to and from work, a hopper for the gatherer, means vertically pivoting the gatherer with the hopper, a cradle related with the last named means and supporting the gatherer for vertical, swinging, and side tilting action, and a shovel member on said gatherer and shiftable for being loaded back upon a conveyor truck, said shovel member being tiltable from a slightly to a more abruptly inclined position for operation in loading.

12. The combination with a movable truck, of a carriage pivotally connected with the truck for horizontal swinging movement, a hopper on the carriage, material gatherer mechanism, means supporting said gatherer mechanism upon said carriage and permitting vertical, swinging, and lateral tilting movements to said mechanism, mechanism operative upon the gatherer mechanism to shuttle the same forward and backward irrespective of the position of the same when vertically or horizontally swung or laterally tilted, a double shovel on the outer end of said gatherer mechanism, and an adjustable trough related with said gatherer mechanism and communicative at all times with the hopper.

13. The combination with a movable truck, of a carriage pivotally connected with the truck for horizontal swinging movement, a hopper on the carriage, material gatherer mechanism, means supporting said gatherer mechanism upon said carriage and permitting vertical, swinging, and lateral tilting movements to said mechanism, mechanism operative upon the gatherer mechanism to shuttle the same forward and backward irrespective of the position of the same when vertically or horizontally swung or laterally tilted, a double shovel on the outer end of said gatherer mechanism, an adjustable trough related with said gatherer mechanism and communicative at all times with the hopper, and mechanism for moving the gatherer mechanism for the swinging thereof vertically and horizontally.

14. The combination with a movable truck, of a carriage pivotally connected with the truck for horizontal swinging movement, a hopper on the carriage, material gatherer mechanism, means supporting said gatherer mechanism upon said carriage and permitting vertical, swinging, and lateral tilting movements to said mechanism, mechanism operative upon the gatherer mechanism to shuttle the same forward and backward irrespective of the position of the same when vertically or horizontally swung or laterally tilted, a double shovel on the outer end of said gatherer mechanism, an adjustable trough related with said gatherer mechanism and communicative at all times with the hopper, mechanism for moving the gatherer mechanism for the swinging thereof vertically and horizontally, and conveyor chains related with the gatherer mechanism and disposed to provide an intermediate trough.

15. The combination with a movable truck, of a carriage pivotally connected with the truck for horizontal swinging movement, a hopper on the carriage, material gatherer mechanism, means supporting said gatherer mechanism upon said carriage and permitting vertical, swinging, and lateral tilting movements to said mechanism, mechanism operative upon the gatherer mechanism to shuttle the same forward and backward irrespective of the position of the same when vertically or horizontally swung or laterally tilted, a double shovel on the outer end of said gatherer mechanism, an adjustable trough related with said gatherer mechanism and communicative at all times with the hopper, mechanism for moving the gatherer mechanism for the swinging thereof vertically and horizontally, conveyor chains related with the gatherer mechanism and disposed to provide an intermediate trough, and means for driving the conveyor chains.

16. The combination with a movable truck, of a carriage pivotally connected with the truck for horizontal swinging movement, a hopper on the carriage, material gatherer mechanism, means supporting said gatherer mechanism upon said carriage and permitting vertical, swinging, and lateral tilting movements to said mechanism, mechanism operative upon the gatherer mechanism to shuttle the same forward and backward irrespective of the position of the same when vertically or horizontally swung or laterally tilted, a double shovel on the outer end of said gatherer mechanism, an adjustable trough related with said gatherer mechanism and communicative at all times with the hopper, mechanism for moving the gatherer mechanism for the swinging thereof vertically and horizontally, conveyor chains related with the gatherer mechanism and disposed to provide an intermediate trough, means for driving the conveyor chains, and cutting bits related with the conveyor chains and movable over shovel ends of the gatherer mechanism.

17. In an apparatus or machine of the character described, an endless chain conveyor, a carriage frame, a rotatable coupling on said carriage frame, a tiltable cradle on said coupling and supporting the conveyor, and means for extending said conveyor relative to the carriage frame.

18. In an apparatus or machine of the character described, an endless chain conveyor, a carriage frame, a rotatable coupling on said carriage frame, a tiltable cradle on said coupling and supporting the conveyor, means for extending said conveyor relative to the carriage frame, and means for shuttling the conveyor to and from work.

19. In an apparatus or machine of the character described, an endless chain conveyor, a carriage frame, a rotatable coupling on said carriage frame, a tiltable cradle on said coupling and supporting the conveyor, means for extending said conveyor relative to the carriage frame, means for shuttling the conveyor to and from work, a hopper on the carriage frame, and a bottom section to the conveyor at its inner end and communicative with the hopper and adapted to extend said conveyor when shuttled to the work.

20. In an apparatus or machine of the character described, an endless chain conveyor, a carriage frame, a rotatable coupling on said carriage frame, a tiltable cradle on said coupling and supporting the conveyor, means for extending said conveyor relative to the carriage frame, means for shuttling the conveyor to and from work, a hopper on the carriage frame, a bottom section to the conveyor at its inner end and communicative with the hopper and adapted to extend said conveyor when shuttled to the work, and gatherers related with the chain conveyor.

21. In an apparatus or machine of the character described, an endless chain conveyor bodily movable to and from work, drum and cable assembly for imparting movement to the conveyor, and a kingbolt pivotally supporting the conveyor and having built-in sheaves disposed to guide the cables correspondingly to the movements of said conveyor.

22. In an apparatus or machine of the character described, coal mining mechanism having an endless chain conveyor, drum and cable assembly for the conveyor, a hopper communicative with the conveyor, a coupling between the conveyor and hopper and movable about the latter, a kingbolt pivotally connecting the conveyor with the hopper for horizontal swinging movement of said conveyor and having built-in sheaves for the cables to guide the same correspondingly with the swing of said conveyor, a support for the conveyor pivoted to the coupling to permit vertical, swinging, side tilting action and bodily shifting of said conveyor to and from work, and means for maintaining the conveyor constantly in communication with the hopper in all positions of said conveyor.

23. In an apparatus or machine of the character described, a truck, a carriage thereon and having a substantially circular hopper, a material gatherer mechanism mounted for shuttle movement above the carriage to and from work and including spaced substantially parallel universal jointed gatherer chains, foldable gatherer arms carried by the respective chains, double shovels on said mechanism and cooperating with the gatherer arms when unfolded, a rocking support upon the carriage for said gatherer mechanism for permitting vertical, swinging, side tilting action and shuttle movement of said mechanism, and means for shuttling said mechanism to and from work.

24. In an apparatus or machine of the character described, a truck, a carriage thereon and having a substantially circular hopper, a material gatherer mechanism mounted for shuttle movement above the carriage to and from work and including spaced substantially parallel universal jointed gatherer chains, foldable gatherer arms carried by the respective chains, double shovels on said mechanism and cooperating with the gatherer arms when unfolded, a rocking support upon the carriage for said gatherer mechanism for permitting vertical, swinging, side tilting action and shuttle movement of said mechanism, means for shuttling said mechanism to and from work, and means for maintaining the mechanism at all times in communication with the hopper.

25. The combination with a movable truck, of a carriage upon the truck, a hopper on the carriage, a bodily movable material gatherer mechanism above said carriage, a support upon said carriage for said mechanism and allowing vertical, swinging, side tilting action and shuttle movement of said mechanism, and mechanism for imparting shuttle movement to the gatherer mechanism.

26. The combination with a truck, a carriage on the truck, a coupling movable about said carriage, a rocking cradle on the coupling, material gatherer mechanism bodily movable on said cradle, and means for shuttling the said mechanism to and from work when the mechanism is either swung vertically, horizontally or side tilted.

27. The combination with a truck, a carriage on the truck, a coupling movable about said carriage, a rocking cradle on the coupling, material gatherer mechanism bodily movable on said cradle, means for shuttling the said mechanism to and from work when the mechanism is either swung vertically, horizontally or side tilted, a hopper on the carriage, and means for maintaining the mechanism communicative with the hopper at all times.

28. The combination with a truck, a carriage on the truck, a coupling movable about said carriage, a rocking cradle on the coupling, material gatherer mechanism bodily movable on said cradle, means for shuttling the said mechanism to and from work when the mechanism is either swung vertically, horizontally or side tilted, a hopper on the carriage, means for maintaining the mechanism communicative with the hopper at all times, and a double shovel on the outer end of said gatherer mechanism.

29. The combination with a truck, a carriage on the truck, a coupling movable about said carriage, a rocking cradle on the coupling, material gatherer mechanism bodily movable on said cradle, means for shuttling the said mechanism to and from work when the mechanism is either swung vertically, horizontally or side tilted, a hopper on the carriage, means for maintaining the mechanism communicative with the hopper at all times, a double shovel on the outer end of said gatherer mechanism, and extensions on the coupling and engaged by said mechanism for permitting the raising and lowering action thereof when being shuttled to and from the work.

30. The combination with a truck, a carriage on the truck, a coupling movable about said carriage, a rocking cradle on the coupling, material gatherer mechanism bodily movable on said cradle, means for shuttling the said mechanism to and from work when the mechanism is either swung vertically, horizontally or side tilted, a hopper on the carriage, means for maintaining the mechanism communicative with the hopper at all times, a double shovel on the outer end of said gatherer mechanism, extensions on the coupling and engaged by said mechanism for permitting the raising and lowering action thereof when being shuttled to and from the work, side guides on the gatherer mechanism, and upwardly divergent fenders coextensive with said guides.

31. The combination with a truck, a carriage on the truck, a coupling movable about said carriage, a rocking cradle on the coupling, material gatherer mechanism bodily movable on said cradle, means for shuttling the said mechanism to and from work when the mechanism is either swung vertically, horizontally or side tilted, and a delivering mechanism leading from the hopper and having a flexing portion.

32. The combination of a mobile hopper, supporting means movable concentrically about said hopper, a support pivoted for rocking movement on said means, gatherer mechanism mounted for shuttle action upon said support, and means for establishing communication between the gatherer mechanism and said hopper during shuttle action and in all positions of said gatherer mechanism.

RODERICK MacEACHEN.